United States Patent
Takiguchi et al.

(10) Patent No.: US 9,103,647 B2
(45) Date of Patent: Aug. 11, 2015

(54) POSITION DETECTION DEVICE

(71) Applicant: DENSO CORPORATION, Kariya, Aichi-pref. (JP)

(72) Inventors: Tomoyuki Takiguchi, Okazaki (JP); Takehito Mizunuma, Chiryu (JP); Yoshiyuki Kono, Obu (JP)

(73) Assignee: DENSO CORPORATION, Kariya (JP)

( * ) Notice: Subject to any disclaimer, the term of this patent is extended or adjusted under 35 U.S.C. 154(b) by 234 days.

(21) Appl. No.: 13/970,906

(22) Filed: Aug. 20, 2013

(65) Prior Publication Data
US 2014/0077794 A1   Mar. 20, 2014

(30) Foreign Application Priority Data

Sep. 18, 2012  (JP) .................................. 2012-204161

(51) Int. Cl.
G01P 3/487 (2006.01)
G01B 7/00 (2006.01)
G01D 5/14 (2006.01)
G01D 11/24 (2006.01)

(52) U.S. Cl.
CPC .............. *G01B 7/003* (2013.01); *G01D 5/145* (2013.01); *G01D 11/245* (2013.01)

(58) Field of Classification Search
USPC .................................................... 324/207.25
See application file for complete search history.

(56) References Cited

U.S. PATENT DOCUMENTS

| | | | |
|---|---|---|---|
| 6,404,186 B1 * | 6/2002 | Schodlbauer | 324/207.2 |
| 6,407,543 B1 | 6/2002 | Hagio et al. | |
| 2007/0247143 A1 * | 10/2007 | Ikeda et al. | 324/207.25 |
| 2008/0012555 A1 | 1/2008 | Ikeda | |
| 2011/0260719 A1 * | 10/2011 | Mase et al. | 324/207.25 |
| 2012/0062218 A1 | 3/2012 | Hiramoto et al. | |

FOREIGN PATENT DOCUMENTS

| | | |
|---|---|---|
| JP | 2008-008756 | 1/2008 |
| JP | 2012-063202 | 3/2012 |

OTHER PUBLICATIONS

Office Action (1 page) dated Jul. 15, 2014 issued in corresponding Japanese Application No. 2012-204161 and English translation (2 pages).

* cited by examiner

*Primary Examiner* — Vincent Q Nguyen
*Assistant Examiner* — Courtney McDonnough
(74) *Attorney, Agent, or Firm* — Nixon & Vanderhye PC

(57) ABSTRACT

A position detection device includes a first component provided by molding of a first mold resin with a first hall IC, a second component provided by molding of a second mold resin with a second hall IC, a terminal connected to a first wiring of the first component and to a second wiring of the second component, and a third mold resin molded to hold and protect the first component, the second component and the terminal. The third mold resin fixing the first component and the second component to each other. Accordingly, the position detection device can be provided, which includes a component usable commonly for a variety of position detection devices which are different in the number of hall ICs.

10 Claims, 9 Drawing Sheets

POSITION DETECTION DEVICE

CROSS REFERENCE TO RELATED APPLICATION

This application is based on and incorporates herein by reference Japanese Patent Application No. 2012-204161 filed on Sep. 18, 2012.

TECHNICAL FIELD

The present disclosure relates to a position detection device which detects, for example, a rotation angle or a displacement amount of a detected object.

BACKGROUND

Conventionally, a position detection device is known, which detects a rotation angle of a throttle valve of an electronic control throttle used for a vehicle, a rotation angle of an accelerator pedal of an accelerator-pedal module, or a displacement amount of a clutch actuator.

A position detection device described in Patent Document 1 (Japanese Patent No. 4367473) includes two hall ICs as magnetic detection elements. In a manufacturing process of the position detection device, firstly, a primary molded product is formed by resin-molding to hold the two hall ICs and a wiring connected to lead wires of the hall ICs. Next, the wiring protruded from the primary molded product is connected to a terminal by welding. Subsequently, secondary molding is performed with resin to hold the primary molded product, the wiring and the terminal. Accordingly, the position detection device is completed.

By the way, there is a position detection device having two hall ICs, and there is a position detection device having a single hall IC. The position detection device described in Patent Document 1 uses the primary molded product in which the two hall ICs are molded, but common use of components is not considered. Thus, this primary molded product cannot be used as a position detection device including a single hall IC. Therefore, when the position detection device having the single hall IC is manufactured, a primary molded product having a single hall IC is required to be designed and manufactured newly, and a manufacturing cost may increase.

Moreover, when a variety of position detection devices are manufactured, the primary molded product having two hall ICs and the primary molded product having a single hall IC are necessarily stored separately, and a cost for parts control may increase.

SUMMARY

It is an objective of the present disclosure to provide a position detection device including a component usable commonly for a variety of position detection devices which are different in the number of magnetic detection elements.

According to an aspect of the present disclosure, a position detection device includes a first component, a second component, a terminal and a third mold resin. The first component includes a first magnetism detection element, a first wiring extending from the first magnetism detection element, and a first mold resin molded to hold the first magnetism detection element and the first wiring. The second component includes a second magnetism detection element, a second wiring extending from the second magnetism detection element, and a second mold resin molded to hold the second magnetism detection element and the second wiring. The terminal is connected to the first wiring protruded from the first mold resin and connected to the second wiring protruded from the second mold resin. The third mold resin is molded to hold and protect the first component, the second component and the terminal. The third mold resin fixes the first component and the second component to each other.

According to another aspect of the present disclosure, there is also provided a method for manufacturing a position detection device. A first mold resin is formed by molding together with the first magnetism detection element and the first wiring to form a first component. A second mold resin is formed by molding together with the second magnetism detection element and the second wiring to form a second component. A terminal is connected to the first wiring protruded from the first mold resin and the second wiring protruded from the second mold resin. A third mold resin is formed by molding together with the first component, the second component and the terminal to fix the first component and the second component to each other and to protect the first component, the second component and the terminal.

Accordingly, the position detection device includes the first component and the second component, thereby including two magnetic detection elements. When the position detection device is used as a position detection device including a single magnetic detection element, either one of the first component or the second component can be used. In other words, the first component or the second component can be used for the position detection device including the two magnetic detection elements and for the position detection device including the single magnetic detection element. Therefore, by making a component of the position detection device be usable commonly for a variety of position detection devices, cost for design and manufacturing of the position detection device can be reduced.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Hereinafter, embodiments of the present disclosure will be described based on drawings.

First Embodiment

Figure 1:
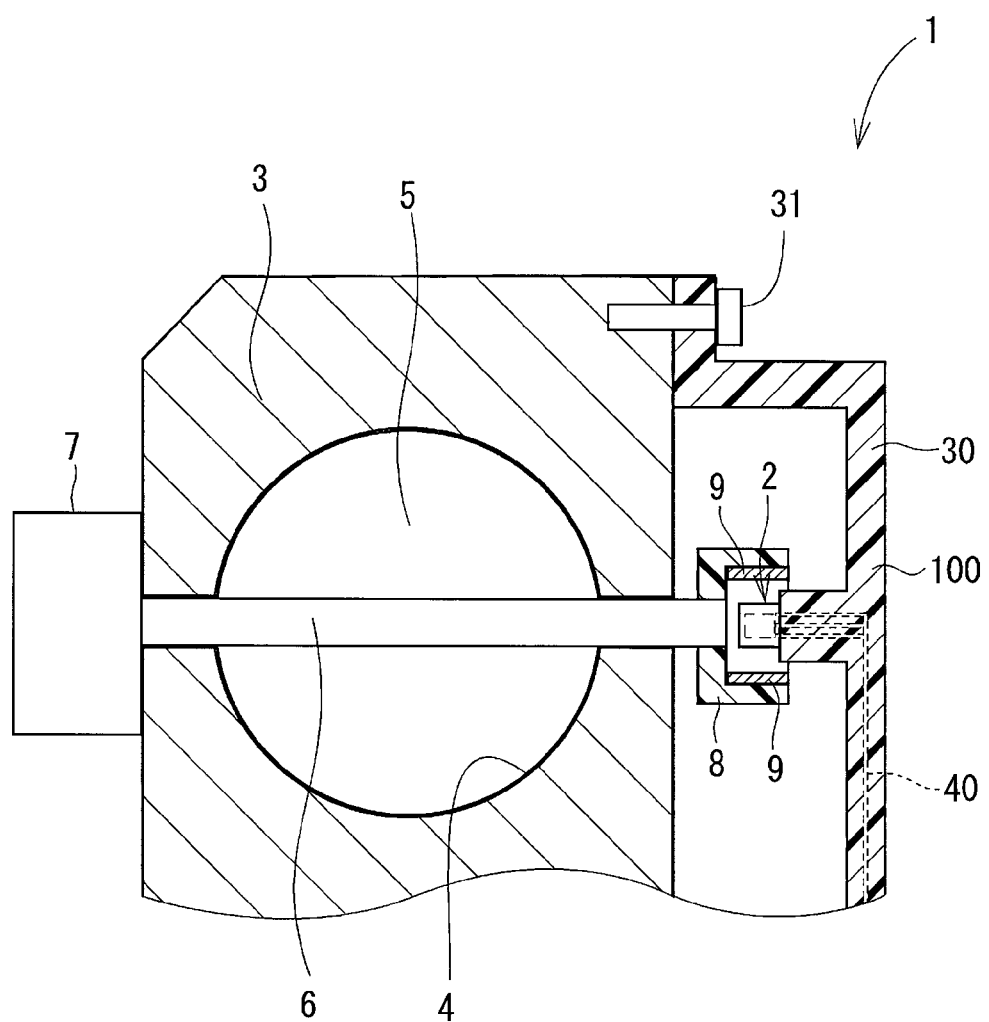
FIG. 1 is a sectional diagram showing an electronic control throttle including a position detection device according to a first embodiment of the present disclosure.
Figure 2:
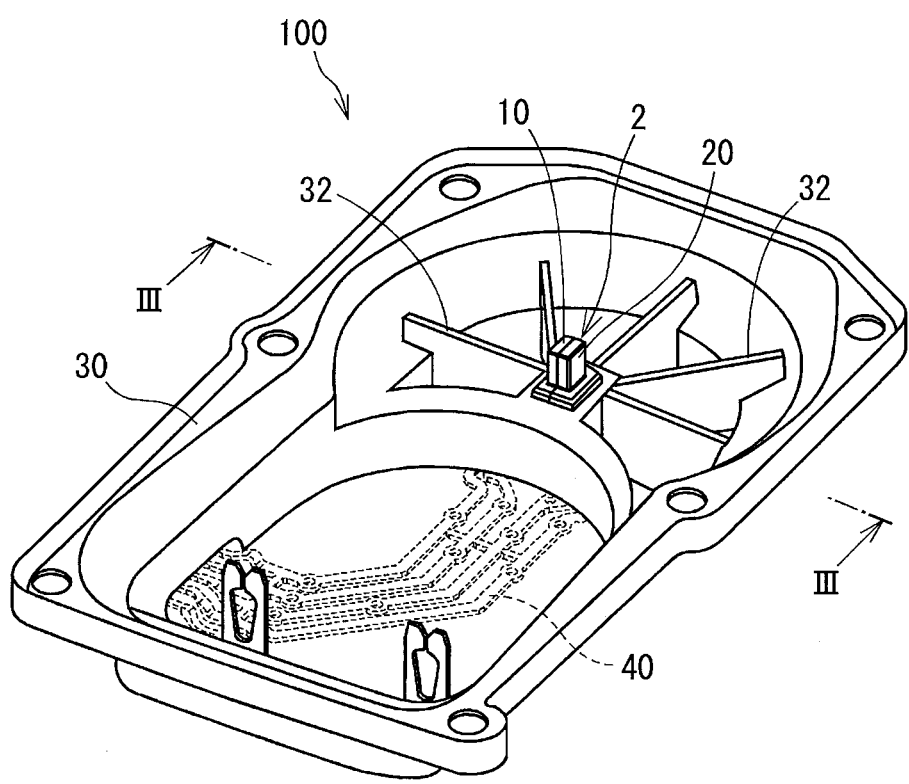
FIG. 2 is a perspective view showing the position detection device according to the first embodiment.
Figure 3:
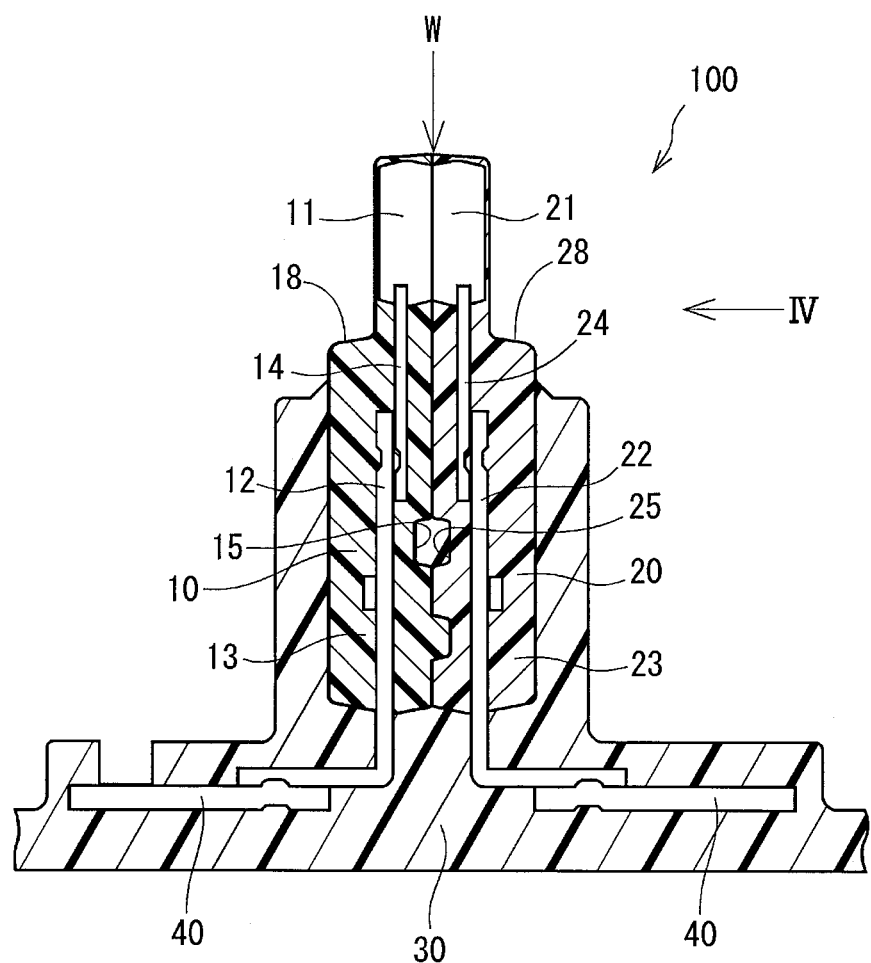
FIG. 3 is a sectional view taken along a line III-III of FIG. 2.

A first embodiment of the present disclosure will be described with reference to FIGS. 1 to 9. A housing cover 100 shown in FIGS. 1 to 3 is used as an example of a position detection device which detects a rotation angle or a displacement amount of a detected object. The housing cover 100 includes a rotation angle sensor 2 used for an electronic control throttle 1 controlling an air flow rate drawn into a cylinder of an engine of a vehicle.

A brief configuration of the electronic control throttle 1 will be described. As shown in FIG. 1, an intake passage 4 through which air is introduced into the engine is formed in a housing 3 of the electronic control throttle 1. A throttle valve 5 having an approximately circular plate shape is provided in the intake passage 4. The throttle valve 5 is fixed to both ends of a valve shaft 6, and the both ends of the valve shaft 6 are rotatably supported by the housing 3. Accordingly, the throttle valve 5 is rotatable with respect to a center of the valve shaft 6 as a rotation axis. A motor 7 is attached to one end of the valve shaft 6. The motor 7 is driven and controlled by a command from an electronic control device (ECU) of the non-shown engine. An open degree of the throttle valve 5 is controlled by driving of the motor 7, and thus an intake air amount supplied to the engine is adjusted.

A bottomed-shaped holder 8 is attached to the other end of the valve shaft 6. Two magnets 9 as a magnetism generation portion and non-shown two yokes connecting the two magnets 9 in a circumferential direction of the holder 8 are provided in a radially-inner wall of the holder 8. The two magnets 9 are provided so as to be opposed to each other in a radial direction of the holder 8 with respect to the rotation axis of the throttle valve 5. North-pole magnetic flux is given to one of the yokes, and south-pole magnetic flux is given to the other of the yokes. Accordingly, magnetic flux flows from the one yoke to the other yoke inside the holder 8, and a magnetic field is generated in which a magnetic flux flows in a direction approximately perpendicular to the rotation axis of the throttle valve 5. When the throttle valve 5 rotates, a direction of the magnetic field inside the holder 8 is changed.

The housing cover 100 is attached to a side of the housing 3 near to the holder 8 such that the holder 8 is located between the housing cover 100 and the housing 3. The housing cover 100 includes a cover main body 30, the rotation angle sensor 2 and the terminal 40. The rotation angle sensor 2 protrudes from the cover main body 30 to be located in the magnetic field inside the holder 8, and outputs an electric signal dependent on a density of magnetic flux. A direction of the magnetic flux passing through the rotation angle sensor 2 is dependent on a direction of the magnetic field inside the holder 8. The signal outputted from the rotation angle sensor 2 is transferred to the ECU through the terminal 40 that is held by the cover main body 30. The ECU controls respective devices of the vehicle. The cover main body 30 is used as an example of a third mold resin molded to hold the first component 10, the second component 20 and the terminal 40.

As shown in FIGS. 1 and 2, the cover main body 30 is made of resin into a dish-like shape and is fixed to the housing 3 by using a screw 31 for example. The cover main body 30 is molded to hold a first component 10, a second component 20 and the terminal 40 together. The cover main body 30 includes multiple ribs 32 for supporting the rotation angle sensor 2 and for enhancing stiffness of the cover main body 30.

Figure 4:
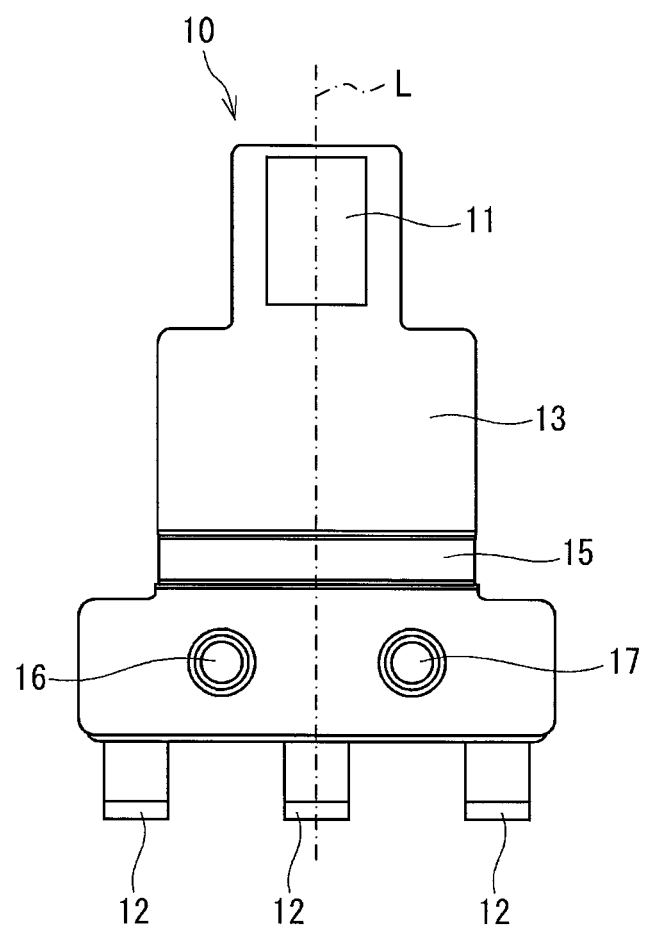
FIG. 4 is a plan view showing a first component of the position detection device, viewed from an arrow IV of FIG. 3, according to the first embodiment.
Figure 5:
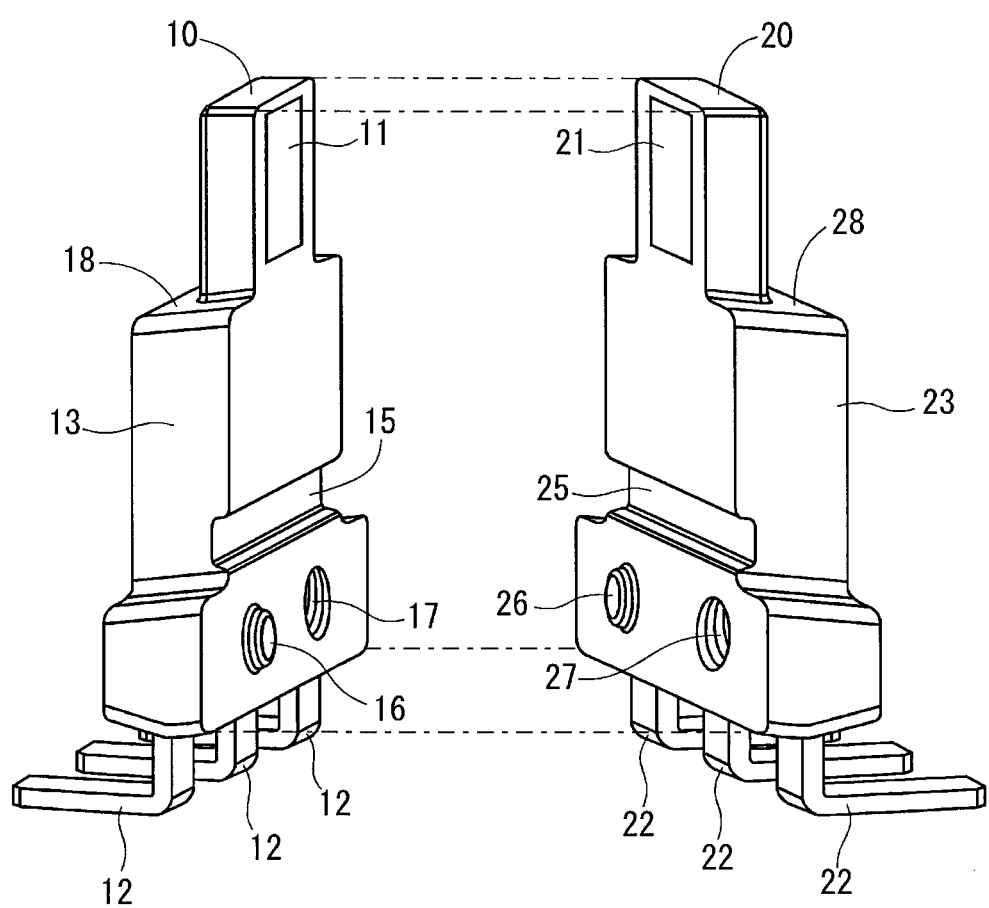
FIG. 5 is a perspective view showing the first component and a second component of the position detection device according to the first embodiment.

As shown in FIG. 3, the first component 10 includes a first hall IC 11 (first magnetism detection element), a first wiring 12 and a first mold resin 13. The second component 20 includes a second hall IC 21 (second magnetism detection element), a second wiring 22 and a second mold resin 23. The hall ICs are magnetism sensors in which a hall element and a signal amplifier circuit are integrated. As shown in FIGS. 3 to 5, the first component 10 and the second component 20 have a substantially same configuration. Specifically, the first hall IC 11 and the second hall IC 21 are the same, and the first mold resin 13 and the second mold resin 23 are the same in shape. The first wiring 12 and the second wiring 22 are the same. The first component 10 is configured by multiple portions, and the second component 20 is configured by multiple portions. The multiple portions of the first component 10 correspond to the multiple portions of the second component 20, respectively. Therefore, explanations of configuration of the second component 20 will be omitted arbitrarily.

A lead wire 14 of the first hall IC 11 is connected to the first wiring 12 by welding. A lead wire 24 of the second hall IC 21 is connected to the second wiring 22 by welding. The first hall IC 11 and the first wiring 12 are integrated by molding of the first mold resin 13. The second hall IC 21 and the second wiring 22 are integrated by molding of the second mold resin 23. An end portion of the first wiring 12 opposite from the lead wire 14 protrudes from the first mold resin 13. An end portion of the second wiring 22 opposite from the lead wire 24 protrudes from the second mold resin 23. The first component 10 includes a first groove 15 on a surface contacting the second component 20. The second component 20 includes a second groove 25 on a surface contacting the first component 10. The first groove 15 and the second groove 25 are provided at the same height, and the first groove 15 and the second groove 25 are filled with resin of the cover main body 30. This resin is attached firmly to an inner wall of the first groove 15 and an inner wall of the second groove 25.

As shown in FIGS. 4 and 5, the first component 10 includes a first convex portion 16 and a first concave portion 17 symmetrically on the surface contacting the second component 20. The first convex portion 16 protrudes from the surface of the first component 10 contacting the second component 20, and the first concave portion 17 is recessed from the surface of the first component 10 contacting the second component 20. The first convex portion 16 and the first concave portion 17 are symmetrical to each other with respect to a vertical center line L of the first component 10 as shown in FIG. 4. The first component 10 has a plane-symmetrical shape viewed from the second component 20. The second component 20 includes a second convex portion 26 and a second concave portion 27 symmetrically on the surface contacting the first component 10. The second convex portion 26 protrudes from the surface of the second component 20 contacting the first component 10, and the second concave portion 27 is recessed from the surface of the second component 20 contacting the first component 10. The second convex portion 26 and the second concave portion 27 are symmetrical to each other with respect to a vertical center line of the second component 20, similarly to the first component 10. The second component 20 has a plane-symmetrical shape viewed from the first component 10. The first convex portion 16 and the second convex portion 26 have cylindrical tapered shapes in which the diameter becomes smaller toward the end, as shown in FIG. 5. The first concave portion 17 and the second concave portion 27 have cylindrical tapered hole shapes in which the diameter becomes smaller toward the bottom, as shown in FIG. 5. When the first component 10 and the second component 20 are opposed and made to be in contact with each other, the first convex portion 16 of the first component 10 and the second concave portion 27 of the second component 20 are fitted with each other, and the first concave portion 17 of the first component 10 and the second convex portion 26 of the second component 20 are fitted with each other. Accordingly, as shown by alternate long and short dash lines of FIG. 5, the first component 10 and the second component 20 are fitted with each other such that their outlines are coincide with each other without shifting from each other.

Figure 6:
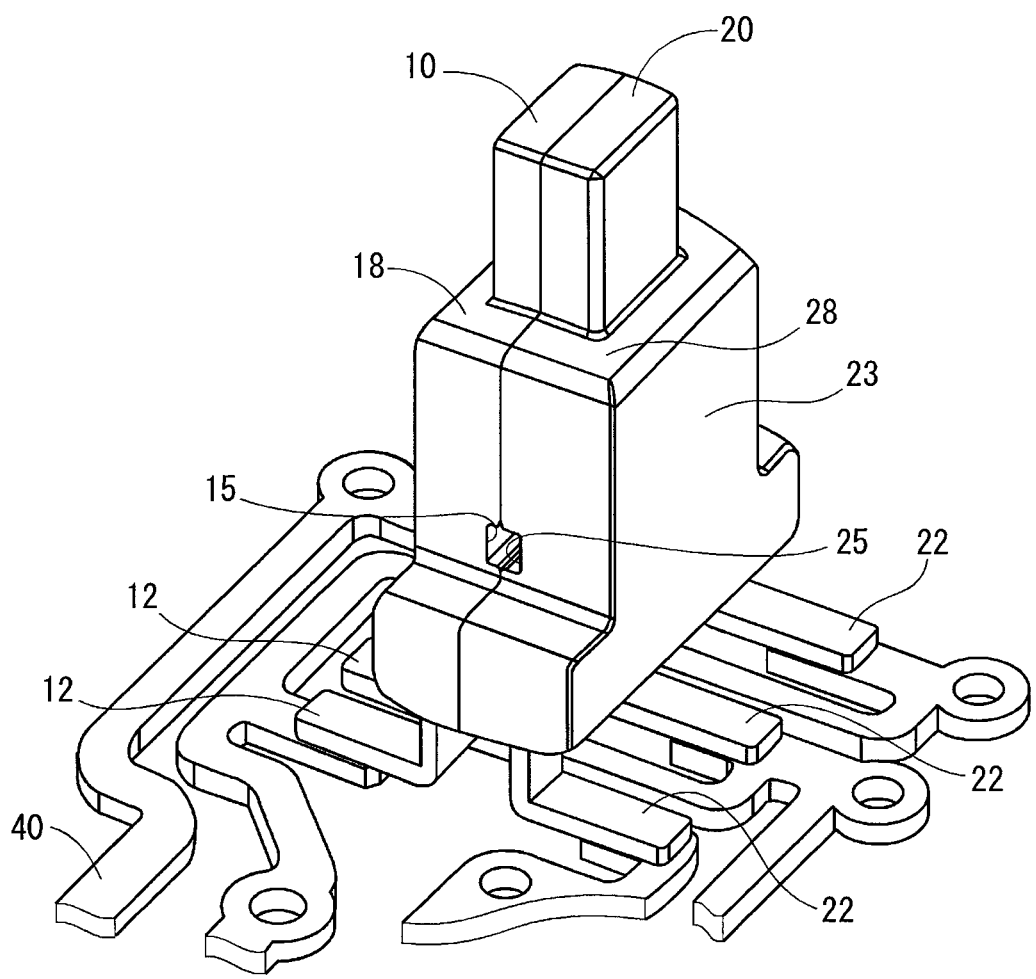
FIG. 6 is a perspective view showing the first component, the second component and a terminal of the position detection device according to the first embodiment.
Figure 7:
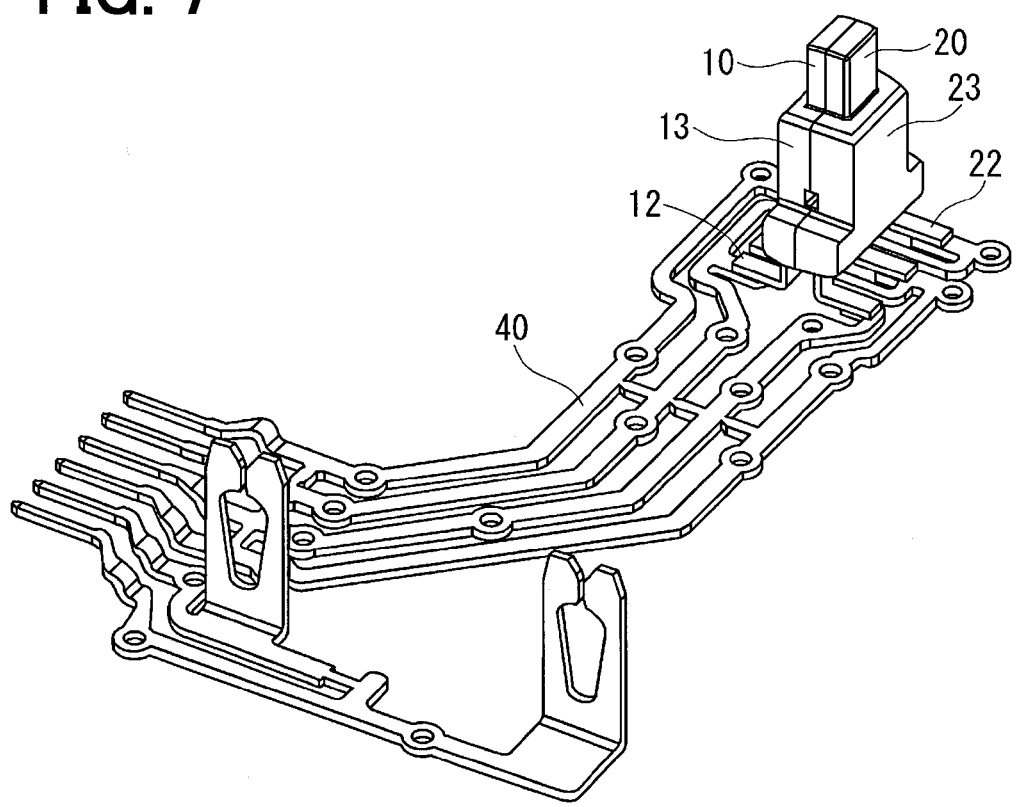
FIG. 7 is a perspective view showing the first component, the second component and a terminal of the position detection device according to the first embodiment.

As shown in FIGS. 6 and 7, the first wiring 12 protruding from the first mold resin 13 of the first component 10 and the second wiring 22 protruding from the second mold resin 23 of the second component 20 are separately connected to the terminal 40 by welding. As shown in FIGS. 1 to 3, the cover main body 30 is molded to hold the first component 10, the second component 20 and the terminal 40. Accordingly, the cover main body 30 of the housing cover 100 fixes the first component 10 and the second component 20 to each other, and protects the first wiring 12, the second wiring 22 and the terminal 40 from water, heat and impact for example.

Figure 8:
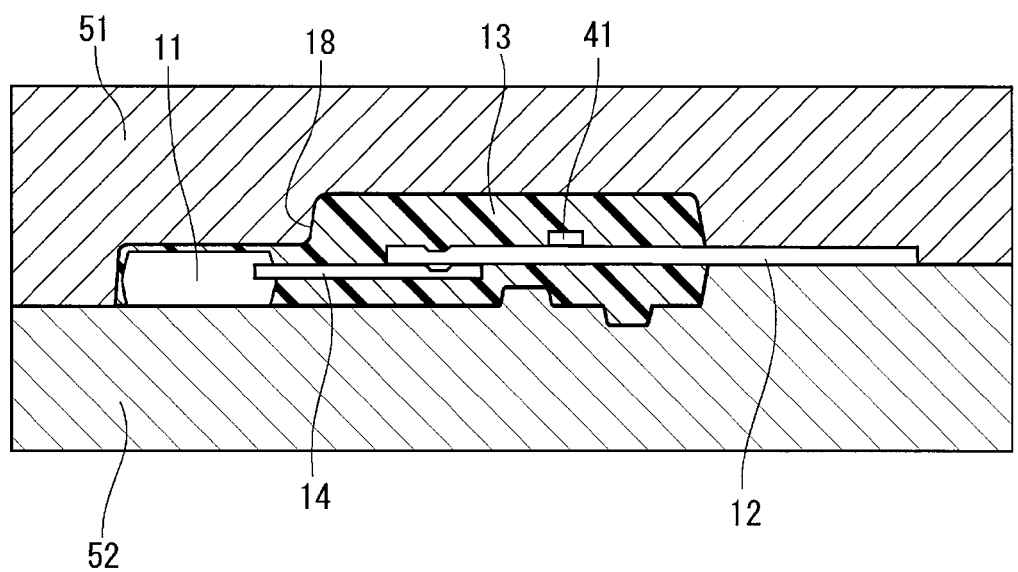
FIG. 8 is a schematic diagram showing a manufacturing method of the first component of the position detection device according to the first embodiment.

Next, a manufacturing method of the housing cover 100 of the present embodiment will be described. Firstly, the lead wire 14 of the first hall IC 11 is connected to the first wiring 12 by welding. Next, a condenser 41 is soldered to the first wiring 12. Subsequently, as shown in FIG. 8, primary molding is performed. In the primary molding, the first hall IC 11, the first wiring 12 and the condenser 41 are located between dies including an upper die 51 and a lower die 52. After joining the dies 51 and 52, heated and melted resin is poured into the dies through a non-shown gate provided in the dies 51 and 52. Then, the dies 51 and 52 are kept at a predetermined pressure to solidify the resin, and subsequently, a primary molded product is taken from the dies 51 and 52 by opening the die. Accordingly, the first component 10 is made. The first component 10 has a first inclined surface 18 (first inclined portion) as shown in FIGS. 3, 5, 6 and 8, and the first inclined surface 18 has a gradient to facilitate taking the primary molded product out of the dies 51 and 52. A flat contact surface of the first component 10 and a flat contact surface of the second component 20 is in contact with each other. The first inclined surface 18 is flat and is at an angle with the flat surface of the first component 10 contacting the second component 20, so that the nearest part of the first inclined surface 18 to the second component 20 is located to be nearest to the first hall IC 11. The second component 20 has the same configuration as the first component 10, and is made in the same process as the first component 10. The second component 20 has a second inclined surface 28 (second inclined portion) as shown in FIGS. 3, 5 and 6, the second inclined surface 28 has a gradient to facilitate taking the primary molded product out of the dies 51 and 52. The second inclined surface 28 is flat and is at an angle with the flat surface of the second component 20 contacting the first component 10, so that the nearest part of the second inclined surface 28 to the first component 10 is located to be nearest to the second hall IC 21.

Next, the first wiring 12 of the first component 10 and the second wiring 22 of the second component 20 are bended at their predetermined positions. Subsequently, the first component 10 and the second component 20 are opposed to each other and made to be in contact with each other. Keeping this state of the first and second components 10 and 20, the first wiring 12 of the first component 10 and the second wiring 22 of the second component 20 are fixed to the terminal 40 by welding. Thus, a configuration shown in FIGS. 6 and 7 can be obtained.

Figure 9:
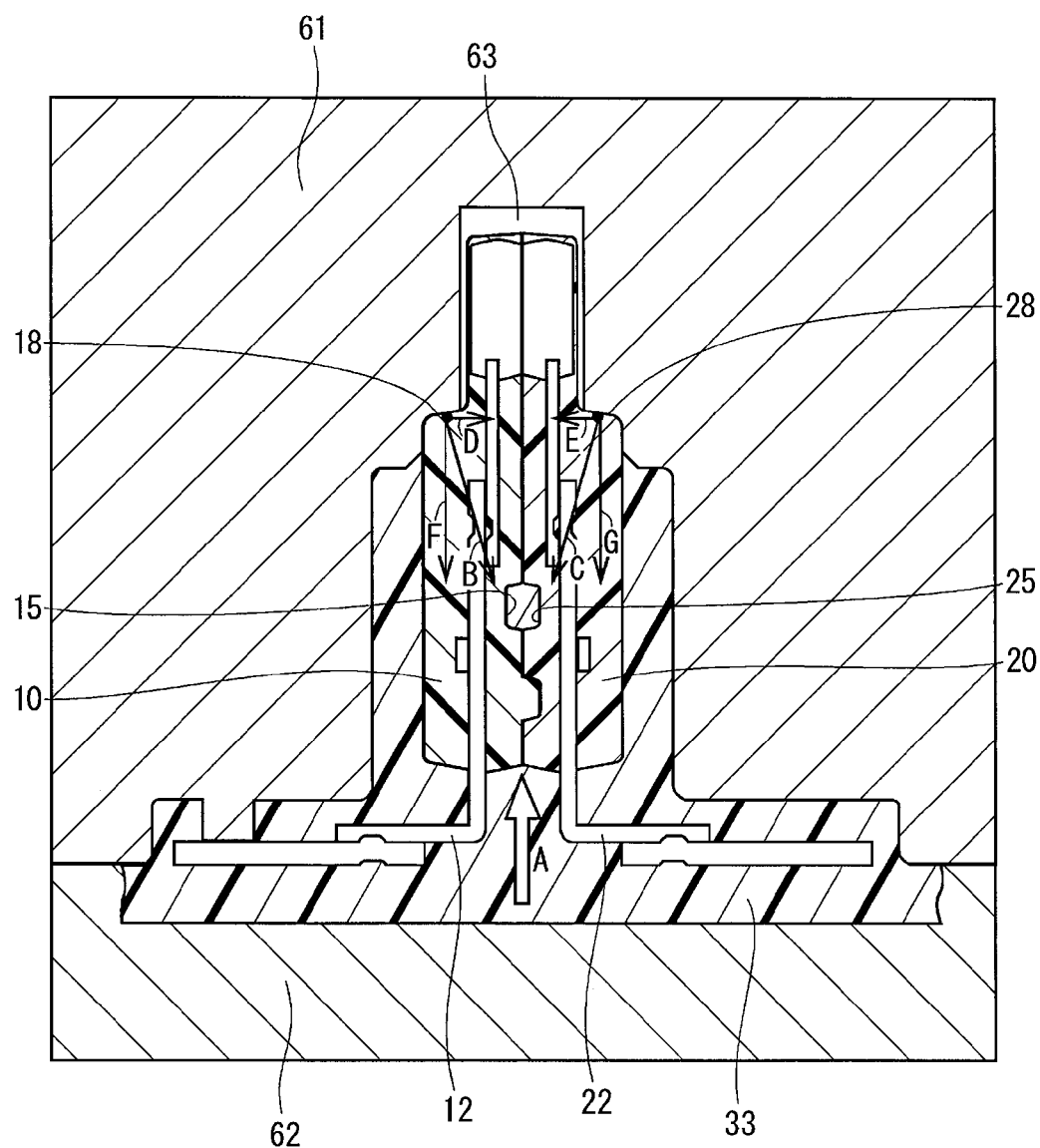
FIG. 9 is a schematic diagram showing a manufacturing method of the position detection device according to the first embodiment.

Subsequently, as shown in FIG. 9, secondary molding is performed. In the secondary molding, the first component 10, the second component 20 and the terminal 40 are located in the die 61, 62 including an upper die 61 and a lower die 62. After joining the dies 61 and 62, heated and melted resin 33 is poured into the die 61, 62 through a non-shown gate provided in the die 61, 62. The poured melted resin 33 flows from the terminal 40 toward the first wiring 12 of the first component 10 and the second wiring 22 of the second component 20. The resin 33 is filled into the first groove 15 and the second groove 25. As a result, the resin 33 is molded to hold the terminal 40, the first component 10 and the second component 20. The resin 33, in other words, the cover main body 30 extends from the terminal 40 to a part of the first component 10, from which the first wiring 12 is protruded, and extends to a part of the second component 20, from which the second wiring 22 is protruded.

When the melted resin 33 is poured into and flows in the dies 61 and 62, as shown by an arrow A of FIG. 9, a pressure of the resin 33 is applied to an end surface of the first component 10 from which the first wiring 12 protrudes, and is applied to an end surface of the second component 20 from which the second wiring 22 protrudes. The first inclined surface 18 of the first component 10 is inclined toward the second component 20 with respect to a direction of pouring of the melted resin 33. The second inclined surface 28 of the second component 20 is inclined toward the first component 10 with respect to the direction of pouring of the melted resin 33. As shown in FIG. 9, the die 61 fluid-tightly contacts the first inclined surface 18 of the first component 10 and the second inclined surface 28 of the second component 20. Thus, the flow of the melted resin 33 is blocked by the inclined surfaces 18 and 28 and the die 61, and thus the melted resin 33 is prevented from entering into a cavity 63 in which the hall ICs 11 and 21 are located.

When the pressure of the melted resin 33 is applied to the end surface of the first component 10 from which the first wiring 12 protrudes and to the end surface of the second component 20 from which the second wiring 22 protrudes, reaction force acts on a contact position between the die 61 and the inclined surfaces 18, 28 as shown by arrows B and C of FIG. 9. The reaction force shown by the arrow B can be resolved into a component force D and a component force F. The reaction force shown by the arrow C can be resolved into a component force E and a component force G. The component force D and the component force E, which are opposite each other, act on the first component 10 and the second component 20, respectively, in directions so that the first component 10 and the second component 20 are firmly attached to each other. Accordingly, the first component 10 and the second component 20 are firmly attached to each other. Since a gradient of the first inclined surface 18 of the first component 10 and a gradient of the second inclined surface 28 of the second component 20 are the same, a magnitude of the component force D and a magnitude of the component force E are the same, and a magnitude of the component force F and a magnitude of the component force G are the same. Accordingly, the first component 10 and the second component 20 are located at a center of the cavity 63 of the dies 61, 62 accommodating the first component 10 and the second component 20. Then, the dies 61 and 62 are pressurized for a predetermined period so that the resin 33 is solidified, and the cover main body 30 is molded. After the molding of the cover main body 30, a secondary molded product is taken out of the dies 61 and 62 by opening the die. Accordingly, the housing cover 100 is made.

The present embodiment provides effects as follows. In the present embodiment, the cover main body 30 of the housing cover 100 is resin-molded to hold the first component 10, the second component 20 and the terminal 40. This housing cover 100 includes the first component 10 and the second component 20, thereby including the two hall ICs 11 and 12. When the housing cover 100 is used as a position detection device having a single hall IC, either one of the first component 10 or the second component 20 can be used. In other words, the first component 10 or the second component 20 can be used for a position detection device like the housing cover 100 of the present embodiment including the two hall ICs 11 and 12, or for the position detection device having the single hall IC. Therefore, by making components be usable commonly for a variety of position detection devices, cost for design and manufacturing can be reduced.

In the present embodiment, the first component 10 and the second component 20 are the same in configuration. Thus, by making the first component 10 and the second component 20 be usable commonly, cost for design and manufacturing of a variety of position detection devices can be reduced.

In the present embodiment, the first component 10 includes the first groove 15, and the second component 20 includes the second groove 25. The resin of the cover main body 30 is filled into the first groove 15 and the second groove 25. After injection molding of the cover main body 30, an inner wall of the first groove 15 and an inner wall of the second groove 25 are attached firmly to the resin of the cover main body 30. Hence, even if water penetrates through, as shown by an arrow W of FIG. 3, between the first component 10 and the second component 20 which are exposed on the cover main body 30, the penetrating water can be prevented from flowing toward the terminal 40 through the first groove 15 and the second groove 25. Therefore, the penetration of water can be prevented from causing short of the first wiring 12, the second wiring 22 or the terminal 40.

In the present embodiment, the first component 10 includes the first convex portion 16 and the first concave portion 17 symmetrically, and the second component 20 includes the second convex portion 26 and the second concave portion 27 symmetrically. The first convex portion 16 of the first component 10 and the second concave portion 27 of the second component 20 are fitted with each other, and the first concave portion 17 of the first component 10 and the second convex portion 26 of the second component 20 are fitted with each other. Accordingly, the first component 10 and the second component 20 are positioned correctly with respect to each other. Therefore, position accuracy of the hole ICs 11 and 12 of the housing cover 100 can be improved.

In the present embodiment, the first component 10 includes the first inclined surface 18 at a position that is pressed against the die 61 by the pressure force A of the melted resin 33 in the injection molding of the cover main body 30. The second component 20 includes the second inclined surface 28, similarly to the first component 10. At the time of the injection molding of the cover main body 30, a pressure of the melted resin 33 is applied to the first component 10 and the second component 20, and a reaction force acts on the contact position between the die 61 and the inclined surfaces 18, 28. Because of the reaction force, the first component 10 and the second component 20 are firmly attached to each other. Additionally, the reaction force causes the first component 10 and the second component 20 to be placed at the center of the cavity 63 of the dies 61 and 62 accommodating the first component 10 and the second component 20. Therefore, position accuracy of the hole ICs 11 and 12 of the housing cover 100 can be improved. The first inclined surface 18 of the first component 10 functions as a gradient useful for taking the first component 10 out of the dies 61, 62 in the injection molding of the first mold resin 13. The second inclined surface 28 of the second component 20 is also used similarly to the first inclined surface 18 in the injection molding of the first mold resin 13.

Second Embodiment

Figure 10:
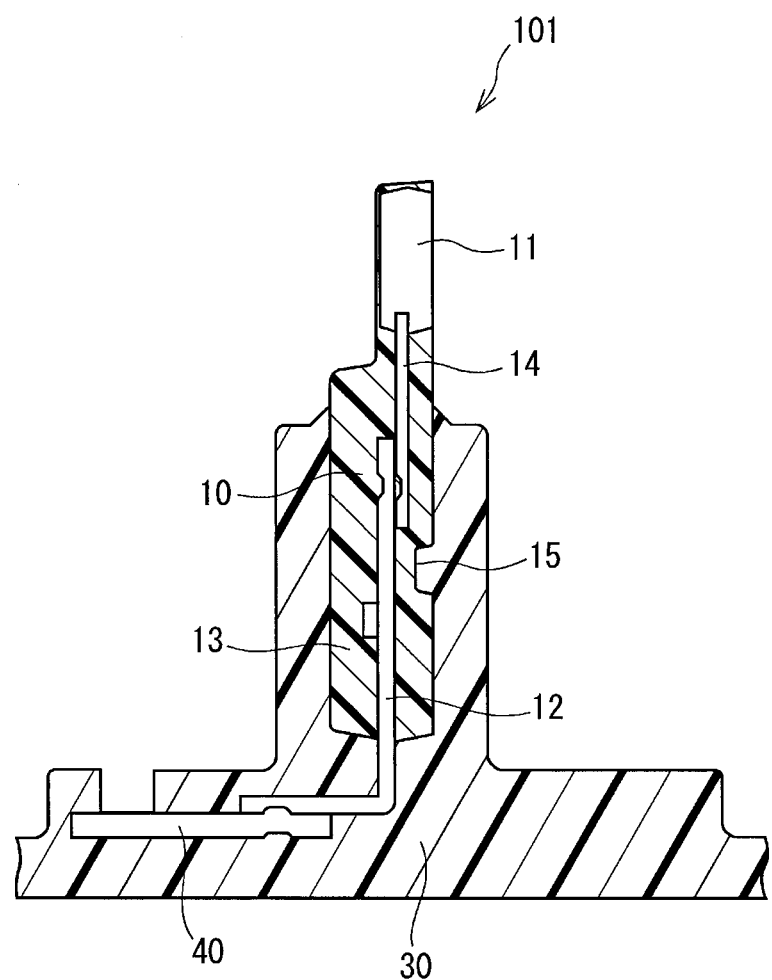
FIG. 10 is a sectional diagram showing the position detection device according to a second embodiment of the present disclosure.

A second embodiment of the present disclosure will be described with reference to FIG. 10. In the second embodiment, a configuration substantially same as that of the above-described first embodiment is assigned the same numeral as that of the first embodiment, and explanations of the configuration will be omitted. In the second embodiment, a housing cover 101 is made by using not two components but a single first component 10, and includes a single hall IC 11. Alternatively, the housing cover 101 may use a second component 20. In also the second embodiment, the cost for design and manufacturing can be reduced by making the component 10 or 20 of the position detection device be usable commonly.

Although the present disclosure has been fully described in connection with the preferred embodiments thereof with reference to the accompanying drawings, it is to be noted that various changes and modifications described below will become apparent to those skilled in the art.

In the above-described embodiments, the position detection device is described as the housing cover in which the rotation angle sensor of the electronic control throttle disposed in the vehicle is provided. Alternatively, the position detection device may include a rotation angle sensor which detects a rotation angle of an accelerator pedal of an accelerator-pedal module. Alternatively, the position detection device may include a rotation angle sensor which detects a rotation angle of a tumble control valve. Alternatively, the position detection device may include a stroke sensor which detects a displacement amount of a clutch actuator.

In the above-described embodiments, an example using the hall element as the magnetism detection sensor is described. Alternatively, various detection elements such as a magnetic resistance element can be used.

Accordingly, the present disclosure is not limited to the above-described embodiments, and is feasible in various embodiments without departing from the scope of the disclosure.

Additional advantages and modifications will readily occur to those skilled in the art. The disclosure in its broader terms is therefore not limited to the specific details, representative apparatus, and illustrative examples shown and described.

What is claimed is:

1. A position detection device comprising:
   a first component including a first magnetism detection element, a first wiring extending from the first magnetism detection element, and a first mold resin molded to hold the first magnetism detection element and the first wiring;
   a second component including a second magnetism detection element, a second wiring extending from the second magnetism detection element, and a second mold resin molded to hold the second magnetism detection element and the second wiring;

a terminal connected to the first wiring protruded from the first mold resin and connected to the second wiring protruded from the second mold resin;

a third mold resin molded to hold the first component, the second component and the terminal, the third mold resin fixing the first component and the second component to each other, the third mold resin protecting the first wiring, the second wiring and the terminal, wherein the first component and the second component are in contact with each other, the first component includes a first groove on a surface contacting the second component, the second component includes a second groove at the same height as the first groove on a surface contacting the first component, and the third mold resin is molded to extend from the terminal to the first wiring of the first component and to the second wiring of the second component, and the first groove and the second groove are filled with the third mold resin.

2. The position detection device according to claim 1, wherein the first mold resin and the second mold resin are the same in shape.

3. The position detection device according to claim 1, wherein the first component and the second mold resin are the same in configuration.

4. The position detection device according to claim 1, wherein the third mold resin is formed by injection molding, in which a melted resin is poured into a die capable of accommodating the first component and the second component, the first component includes a first inclined surface inclined toward the second component with respect to a direction of the pouring of the melted resin at a position pressed against the die by a pressure of the melted resin, and the second component includes a second inclined surface inclined toward the first component with respect to the direction of the pouring of the melted resin at a position pressed against the die by the pressure of melted resin.

5. The position detection device according to claim 1, wherein a flat contact surface of the first component and a flat contact surface of the second component are in contact with each other, the first component has a first inclined surface which is flat at an angle with the flat contact surface of the first component, a nearest part of the first inclined surface to the second component is located nearest to the first magnetism detection element, the second component has a second inclined surface which is flat at an angle with the flat contact surface of the second component, and a nearest part of the second inclined surface to the first component is located nearest to the second magnetism detection element.

6. A position detection device comprising:

a first component including a first magnetism detection element, a first wiring extending from the first magnetism detection element, and a first mold resin molded to hold the first magnetism detection element and the first wiring;

a second component including a second magnetism detection element, a second wiring extending from the second magnetism detection element, and a second mold resin molded to hold the second magnetism detection element and the second wiring;

a terminal connected to the first wiring protruded from the first mold resin and connected to the second wiring protruded from the second mold resin;

a third mold resin molded to hold the first component, the second component and the terminal, the third mold resin fixing the first component and the second component to each other, the third mold resin protecting the first wiring, the second wiring and the terminal, wherein the first component symmetrically includes a first convex portion and a first concave portion on a surface contacting the second component, the second component symmetrically includes a second convex portion and a second concave portion on a surface contacting the first component, and the first convex portion and the second concave portion are fitted with each other, and the first concave portion and the second convex portion are fitted with each other.

7. The position detection device according to claim 6, wherein the first component and the second component are in contact with each other, the first component includes a first groove on a surface contacting the second component, the second component includes a second groove at the same height as the first groove on a surface contacting the first component, and the third mold resin is molded to extend from the terminal to the first wiring of the first component and to the second wiring of the second component, and the first groove and the second groove are filled with the third mold resin.

8. The position detection device according to claim 6, wherein the first mold resin and the second mold resin are the same in shape.

9. The position detection device according to claim 6, wherein the first component and the second mold resin are the same in configuration.

10. The position detection device according to claim 6, wherein the third mold resin is formed by injection molding, in which a melted resin is poured into a die capable of accommodating the first component and the second component, the first component includes a first inclined surface inclined toward the second component with respect to a direction of the pouring of the melted resin at a position pressed against the die by a pressure of the melted resin, and the second component includes a second inclined surface inclined toward the first component with respect to the direction of the pouring of the melted resin at a position pressed against the die by the pressure of melted resin.

* * * * *